(12) United States Patent
Toulis et al.

(10) Patent No.: US 7,433,649 B2
(45) Date of Patent: Oct. 7, 2008

(54) TAG FOR FACILITATING INTERACTION WITH A WIRELESS COMMUNICATION DEVICE

(75) Inventors: Tadeo T. Toulis, Boston, MA (US); Michael E. Caine, Needham, MA (US); Angela Chang, Cambridge, MA (US); Joonwoo Park, Boston, MA (US); Roberto Tagliabue, Boston, MA (US); Lisa Y. Yong, Boston, MA (US); Adam A. Kumpf, Tipp City, OH (US)

(73) Assignee: Motorola, Inc., Schaumburg, IL (US)

( * ) Notice: Subject to any disclaimer, the term of this patent is extended or adjusted under 35 U.S.C. 154(b) by 302 days.

(21) Appl. No.: 10/937,915

(22) Filed: Sep. 10, 2004

(65) Prior Publication Data

US 2006/0058018 A1  Mar. 16, 2006

(51) Int. Cl.
*H04B 7/00* (2006.01)
*H04Q 7/20* (2006.01)

(52) U.S. Cl. .................... 455/41.2; 455/422.1; 455/434

(58) Field of Classification Search .............. 455/422.1, 455/434, 41.1, 41.2, 456.1, 456.6, 456.7; 340/10.1, 10.41, 10.4, 825.72, 825.69, 539.15, 340/539.11
See application file for complete search history.

(56) References Cited

U.S. PATENT DOCUMENTS

| 4,680,785 | A  | * | 7/1987  | Akiyama et al. ............ 340/7.21 |
| 5,621,385 | A  | * | 4/1997  | Carney ....................... 340/541 |
| 5,650,769 | A  | * | 7/1997  | Campana, Jr. ............. 340/573.4 |
| 5,848,362 | A  | * | 12/1998 | Yamashita .................. 455/567 |
| 6,025,780 | A  |   | 2/2000  | Bowers et al. |
| 6,150,937 | A  | * | 11/2000 | Rackman ................ 340/539.23 |
| 6,216,017 | B1 | * | 4/2001  | Lee et al. ..................... 455/567 |
| 6,424,251 | B1 | * | 7/2002  | Byrne ........................ 340/7.58 |
| 6,512,455 | B2 | * | 1/2003  | Finn et al. ................. 340/572.1 |
| 6,650,231 | B1 | * | 11/2003 | Byrne ......................... 455/567 |
| 6,711,414 | B1 |   | 3/2004  | Lightman et al. |
| 6,892,052 | B2 | * | 5/2005  | Kotola et al. ................ 455/41.2 |
| 6,954,659 | B2 | * | 10/2005 | Tushinsky et al. ............ 455/567 |
| 6,965,298 | B2 | * | 11/2005 | Feinberg .................. 340/10.41 |
| 6,998,985 | B2 | * | 2/2006  | Reisman et al. .......... 340/573.1 |
| 7,091,865 | B2 | * | 8/2006  | Cuddihy et al. .......... 340/573.1 |
| 7,183,925 | B2 | * | 2/2007  | Marshall et al. .......... 340/572.4 |
| 2003/0120745 | A1 |   | 6/2003  | Katagishi et al. |
| 2003/0132301 | A1 |   | 7/2003  | Selker |

(Continued)

FOREIGN PATENT DOCUMENTS

WO  0145038 A2  6/2001

(Continued)

*Primary Examiner*—Sonny Trinh
(74) *Attorney, Agent, or Firm*—Hisashi D. Watanabe (57) ABSTRACT

A tag is provided, which can be associated with one or more individuals and/or a connection to a predetermined network resource, and which can be used to facilitating interaction of the wireless communication device with the corresponding individual(s) and/or resource. The tag includes a transmitter and a storage element including an ID value, which associates the tag with the individual(s) and/or resource. In at least some instances the tag will additionally include a trigger element, such as a user actuatable switch, which will enable an action to be initiated in the nearby wireless communication device, relative to the associated individual(s) and/or resource, in response to an actuation of the trigger element in the tag.

36 Claims, 5 Drawing Sheets

U.S. PATENT DOCUMENTS

| | | |
|---|---|---|
| 2004/0002305 A1 | 1/2004 | Byman-Kivivuori et al. |
| 2004/0010446 A1 | 1/2004 | Vanska et al. |
| 2006/0094405 A1* | 5/2006 | Dupont .................... 455/414.1 |
| 2006/0094411 A1* | 5/2006 | Dupont ....................... 455/417 |
| 2006/0148454 A1* | 7/2006 | Welch ..................... 455/414.1 |

FOREIGN PATENT DOCUMENTS

| | | |
|---|---|---|
| WO | WO 01/45038 A | 6/2001 |
| WO | WO 2004/006044 A2 | 1/2004 |

* cited by examiner

TAG FOR FACILITATING INTERACTION WITH A WIRELESS COMMUNICATION DEVICE

FIELD OF THE INVENTION

The present invention relates in general to user interfaces for interacting with a wireless communication device, such as a radio telephone. More particularly, the present invention relates to a tag, which interacts with a wireless communication device for initiating an action to be performed relative to the wireless communication device.

BACKGROUND OF THE INVENTION

Interaction with many of today's devices require that a user make selections and receive feedback through predefined interfaces, which are generally directly associated with and made part of the device, and consequently are often constrained by the size and shape of the device. As devices shrink in size, the interfaces through which the user interacts with the device will often similarly shrink, and/or will cover an ever greater percentage of the available surfaces.

Several styles of electronic device, such as cellular telephones, have been developed, which help to maximize the amount of surface space available for use in connection with the user interfacing with the device, while still allowing the overall size of the device to shrink. One such example includes clam shell style phones, which provide for a two part housing, that rotate relative to each other about a hinge connection.

However one of the consequences associated with an ever increasing amount of the surface space being dedicated to interacting with the device, is the amount of surface space, which is available for customization or personalization has correspondingly decreased. The desire to customize the devices, on the part of some users, has created sufficient demand for products that enable a user to alter the devices original surfaces. In some instances, these replacement surfaces are referred to as faceplates, which can allow a user to alter the color, the texture, and/or even incorporate licensed content, such as people, places or characters, in the external appearance of the device.

Alternatively, the ever increasing size and capabilities of the interfaces used in the devices have enabled the users to have greater flexibility in customizing/personalizing the interfaces themselves, often in the form of prestored or downloadable content. For example, a picture or pattern can be added to form a background image on the display, sometimes referred to as wallpaper. Still further customization can be accomplished by applying different ringtones, which can supplement or replace the audible nature of the alerts produced by the device, and/or skins, which can supplement or replace the overall style or theme corresponding to the manner in which information is visually presented on the display of the device.

However even as the interfaces increase in quality and size, there continues to be limits relative to the manner in which information can be presented to the user, and limits relative to the opportunities one has in personalizing and customizing the devices.

The present inventors have recognized that further personalization and customization can be achieved through the use of related accessories, that, in addition to allowing a user further opportunities to personalize and customize their experience relative to the device, can also enhance one's ability to interact with the device. Still further, some accessories can be associated with and/or shared between friends, colleagues, etc., and correspondingly facilitate interaction with the device, which in turn can further enhance a user's overall experience with the device, as well as enhance a user's experience relative to a particular individual and/or a group of select individuals.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION

As required, detailed embodiments of the present invention are disclosed herein, however, it is to be understood that the disclosed embodiments are merely exemplary of the invention, which can be embodied in various forms. Therefore, specific structural and functional details disclosed herein are not to be interpreted as limiting, but merely serve as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

Figure 1:
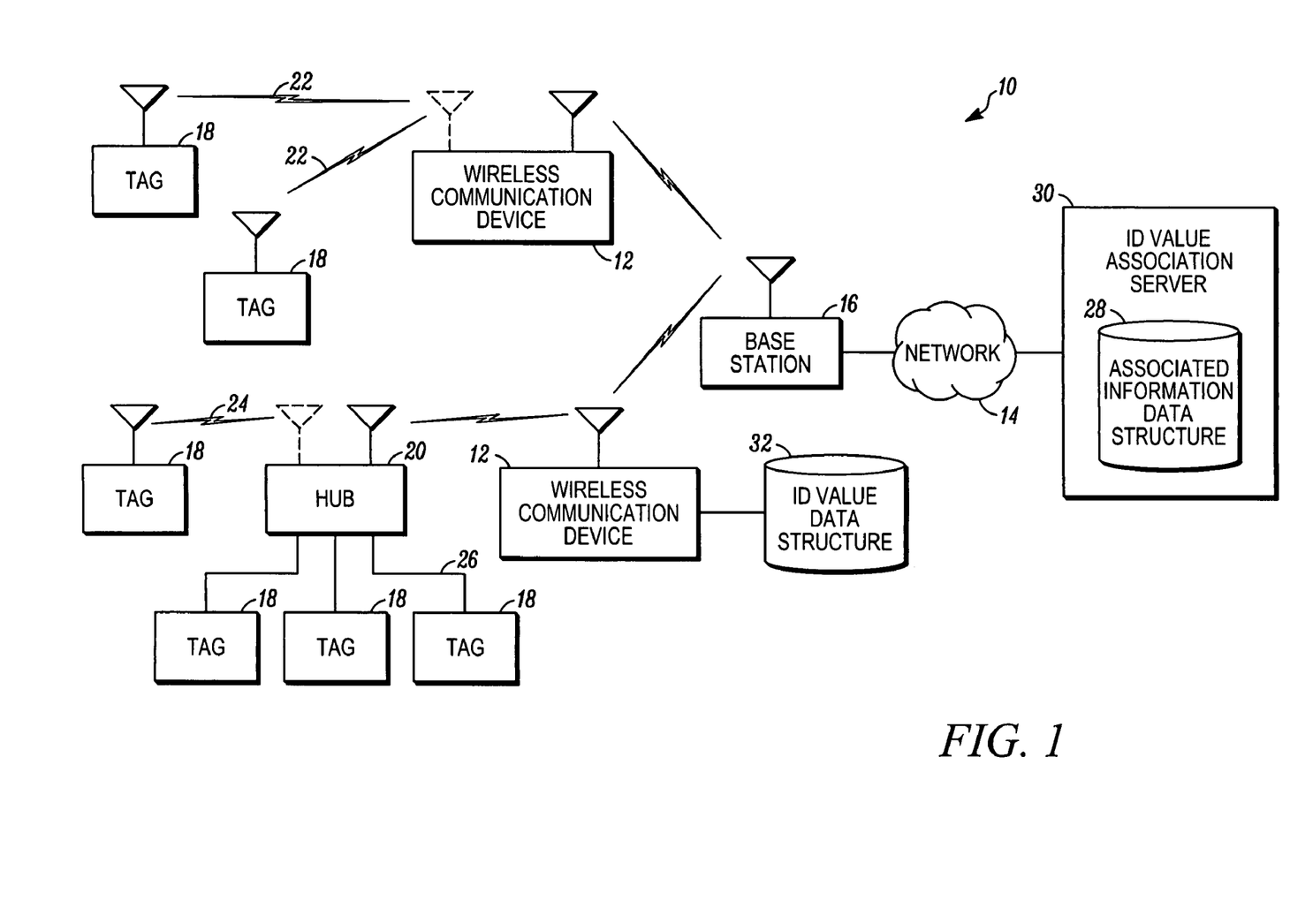
FIG. 1 is a block diagram of an exemplary communication system in accordance with at least one embodiment of the present invention.

FIG. 1 is a block diagram of an exemplary communication system 10 including one or more wireless communication devices 12. In the illustrated embodiment, a pair of wireless communication devices 12 are shown. The wireless communication devices 12 can be any suitable device capable of communicating over a wireless connection within a network, for example one or more of the wireless communication devices could be a radio telephone, such as a cellular telephone. Additionally and/or alternatively, the wireless communication device could incorporate a wireless LAN connection, a short range radio transceiver, such as a Bluetooth transceiver, an infra-red communication transceiver, or other similar communication device not constrained by a physical wired connection.

In at least the illustrated embodiment, the wireless communication devices 12 communicate with a network 14, via one or more base stations 16. The network 14 may include any type of network that is capable of sending and receiving communication signals. In at least one embodiment, the network 14 includes a wireless communication network. The network 14 may also include or be in communication with a data network, such as the Internet, an Intranet, a local area network (LAN), a wide area network (WAN), a cable network, and other like communication systems. The network 14 may also include or be in communication with a telecommunications network, such as a local telephone network, long distance telephone network, cellular telephone network, satellite communications network, cable television network and other like communications systems. Furthermore, the network 14 may include or be in communication with more than one network and may include a plurality of different types of networks. Thus, the network 14 may include or be in communication with a plurality of data networks, a plurality of telecommunications networks, a combination of data and telecommunications networks and other like communication systems.

The wireless communication devices 12 additionally interact with one or more tags 18. In some instances, one or more of the wireless communication devices 12 may interact with one or more of the tags 18 via a hub 20. Generally, the tags 18 provide an alternative manner in which a user of a wireless communication device 12 can interact with the wireless communication device 12. The tags 18 can be linked to one or more individuals other than the user of the communication device 12 and/or can be used to initiate an action to be executed in a nearby wireless communication device 12 in response to the activation of one or more trigger elements.

Previously, most interactions between a wireless communication device 12 and the user of the wireless communication device 12 have been facilitated through embedded interfaces, such as integrated display(s), and keypad(s) and/or buttons. As the amount of functionality in wireless communication devices 12 has increased, different techniques have been used to manage selection and/or initiation of the different functions. For example, user interfaces have incorporated menu applications to make it easier to initiate different tasks, such as a phone book application, which can allow one to select a prestored entry for an individual from a menu including a list of prestored individuals in order to initiate communication with a particular individual.

Tags 18 provide an alternative interface for interacting with a wireless communication device 12. A tag 18 generally represent a physical item, which is at least initially separate from the wireless communication device 12, but which can interact with the wireless communication device 12 when the tag 18 and the wireless communication device 12 are within a predetermined proximity and other predetermined conditions are met. A tag 18 can take the form of a charm or a sticker, and can have an ornamental aspect. To the extent that the tag 18 has an ornamental aspect, the ornamental aspect of the tag 18 can be helpful in distinguishing a particular tag 18 from other tags 18.

As noted above, a tag 18 in some instances may communicate directly 22 with the wireless communication device 12. In other instances a tag 18 may communicate with the wireless communication device 12, via a hub 20. The use of a hub 20 for facilitating communication between a tag 18 and a wireless communication device 12 may be premised on the compatibility of the forms of communication employed by the wireless communication device 12 with the forms of communication employed by the one or more tags 18. Where an incompatibility in the communication capabilities is present, a hub 20 can sometimes be used to bridge the incompatibilities by receiving a communication from either the tag 18 or the wireless communication device 12 and forwarding the communication to the other one of the tag 18 and the wireless communication device 12 in a manner, which is compatible with the communication recipient. In some instances, a hub 20 may be communicatively coupled to one or more tags 18 via a wireless communicative coupling 24. In other instances, the hub 20 may be communicatively coupled to the one or more tags 18 via a physical connection 26. Additionally and/or alternatively, the hub 20 may be used to supply power to one or more corresponding tags 18.

The tags 18 can use various different types of technologies for purposes of communicating with a wireless communication device 12, either directly 22 or via a hub 20 including direct point to point communications, or ad-hoc networking. For example, the tags 18 could incorporate Radio Frequency Identification (RFID) technology. However other forms of communication are similarly possible including, but not limited to, Bluetooth, IEEE 802.11, HomeRF, proprietary RF communications, and infrared communications, as well as standard wireless telecommunication protocols including, but not limited to, analog, CDMA, GSM, TDMA, and UMTS. Furthermore, the communication can be facilitated through an inductive coupling. Still further, to the extent that the tag 18 makes use of a physical connection 26 to communicate, such as with a hub 20, one skilled in the art will readily appreciate that many different protocols would additionally be similarly suitable.

Generally, the tags 18 each have an associated ID value, which can be used to initiate an action in the wireless communication device 12 and/or facilitate interaction with the wireless communication device 12. The particular ID value could be based upon the actions to be executed. In other instances, the ID value may reference a data structure 28 which links the ID value with the appropriate actions to be initiated or the interactions to be facilitated in association with the wireless communication device 12. Such a data structure 28 could be maintained in a server 30 accessible via the network 14. Additionally or alternatively, a copy of the full or an abridged version 32 of the data structure could be maintained in the corresponding wireless communication device 12.

An abridged version maintained in a wireless communication device 12 might only contain the records for ID values that are associated with the particular wireless communication device 12. In some instances, if an ID value is detected by a wireless communication device 12 that is not in the local copy of the ID value data structure 32, the wireless communication device 12 may determine that it is an unauthorized ID value and may correspondingly ignore the ID value. In other instances, if an ID value is detected that is not in the local copy of the ID value data structure 32, the wireless communication device 12 may contact the server 30 to attempt to obtain the appropriate information and/or data record.

Various security information could be associated with the each of the ID values to insure that only authorized wireless communication devices 12 are able to appropriately respond to a received ID value. In some instances, the ID value could include an encryption/decryption key associated with decrypting downloadable content. In other instances, the ID value could represent a digital rights management key for providing access to the downloadable content. In still further instances, an identifier of each of the wireless communication devices 12 authorized to receive and/or respond to the actions or interactions associated with the tag ID value 90 could be stored in connection with the corresponding record in the associated information ID value data structure 28, which could result in wireless communication devices 12 that are not expressly authorized being precluded from having access to the information.

In some instances, the ID value may be comprised of multiple fields. Where the ID value includes multiple fields, one field within the received ID value might designate the particular server 30 to be accessed for determining the meaning of the rest of the ID value fields, where the rest of the ID value fields could corresponds to a particular record in the data structure 28 stored at the designated server 30. In at least one embodiment, the ID value corresponds to an Electronic Product Code (EPC), which is a format commonly used with other applications using RFID type tags.

Figure 2:
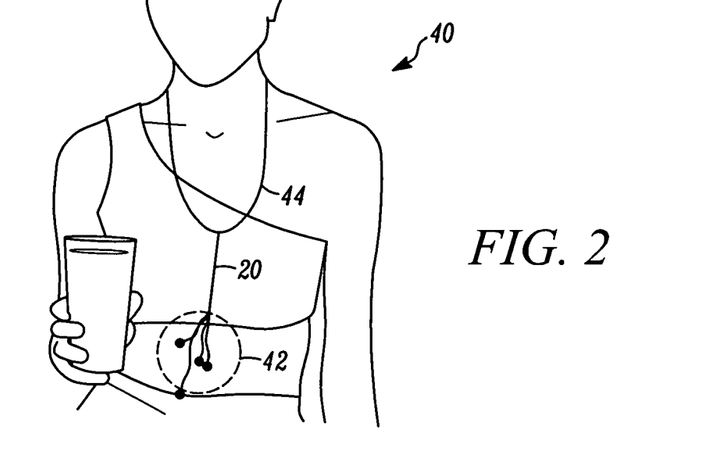
FIG. 2 is a view of one or more exemplary tags and associated hub being worn by a person in accordance with at least one embodiment of the present invention.
Figure 3:
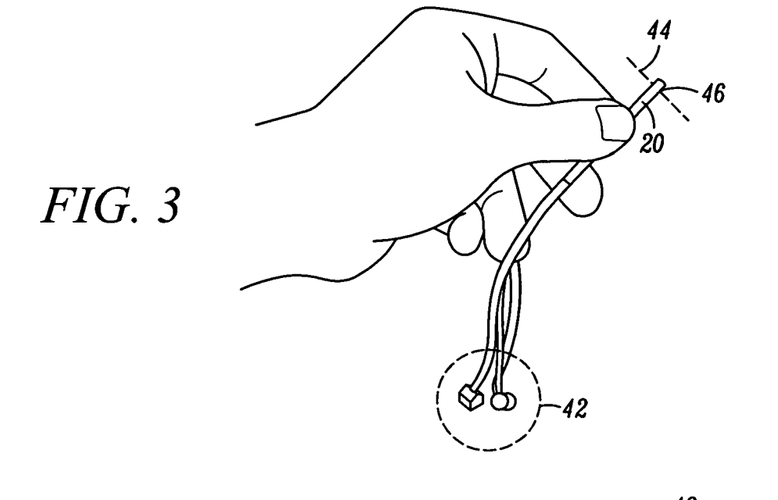
FIG. 3 is an enlarged view of the one or more exemplary tags and associated hub, illustrated in FIG. 2, being held by one's hand.

As noted previously, in accordance with at least one embodiment, the tags 18 facilitate interaction with a wireless communication device 12 by a user 40. FIG. 2 illustrates at least one example of how a plurality of tags 18 in the form of a plurality of charms 42 could be worn by a user to facilitate their availability for use with a corresponding wireless communication device 12. In the illustrated example, the plurality of charms 42 are coupled to a hub 20, which hangs from a strand or necklace 44, that extends around the neck of the user 40. FIG. 3 illustrates an enlarged view of the plurality of charms 42 and associated hub 20, illustrated in FIG. 2, where the hub 20 and the charms 42 are illustrated being held the user's hand. In the illustrated embodiment, the hub 20 includes an opening 46 or passage, which extends through the body of the hub 20, which facilitates attachment of the hub 20 to the strand or necklace 44. While the charms 42 are shown associated with a necklace 44, the charms 42 could alternatively be associated with a bracelet, not shown, which is worn about the wrist of the user 40, as well as other similarly suitable arrangements.

However, while the above noted examples describe embodiments in which tags 18/charms 42 are worn as about the user 40 as a fashion type accessory, there is no requirement that they be adorned as such. The tags 18/charms 42 could alternatively be attached to a hand bag or book bag, or even affixed in some way to the wireless communication device 12. Generally, their use is at the discretion and personal preference of the user 40.

Furthermore, the tags 18 could be in the form of a sticker having an adhesive backing, which allows the tag to be affixed to a surface. Still further, the tag 18 could have a connector like portion, associated with one of the surfaces, which facilitates a mechanical and/or an electrical connection with a matched mating structure associated with the surface of another element. A corresponding connector like portion associated with multiple surfaces of one or more tags 18 might enable a plurality of tags 18 to be daisy chained together. Further yet, the tag 18 could have an opening or passage that extends through the tag 18, similar to the exemplary hub 20, illustrated in FIG. 3, which enables a strand to be threaded through the tag 18.

Figure 4:
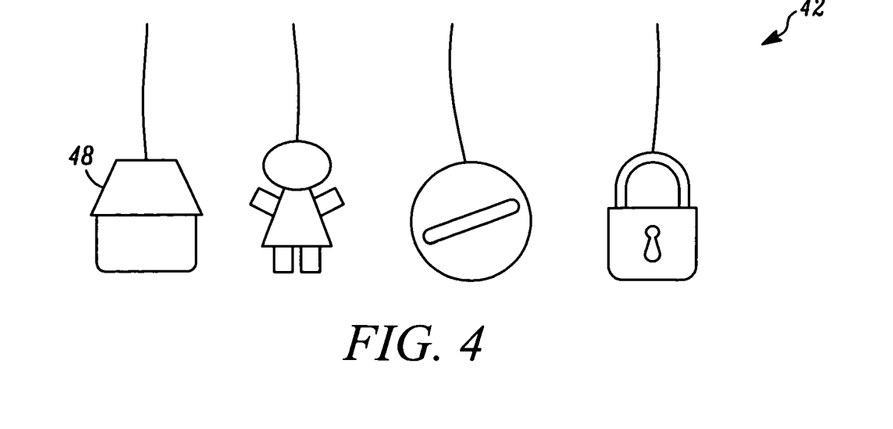
FIG. 4 is a further enlarged view of the one or more exemplary tags illustrated in FIGS. 2 and 3.

FIG. 4 illustrates a plurality of exemplary tags 18 each having a distinct ornamental aspect. As noted previously, a distinct ornamental appearance allows one to distinguish the tags 18 from one another, as well as allow one to tailor the appearance of the tag 18 so as to more readily identify the associated action or interaction relative to the wireless communication device 12. For example, the house shaped tag 48 used in conjunction with the wireless communication device 12 might initiate a telephone call to one's house, or to the extent that an alert indicator has been incorporated into the tag 18, an alert indication associated with the tag 18 might identify an incoming call as being from home or someone who lives with the user 40. Using the tag 18 in conjunction with a wireless communication device 12 to initiate a call to one's house could allow the user to bypass the alternative methods used to initiate such a call.

Figure 5:
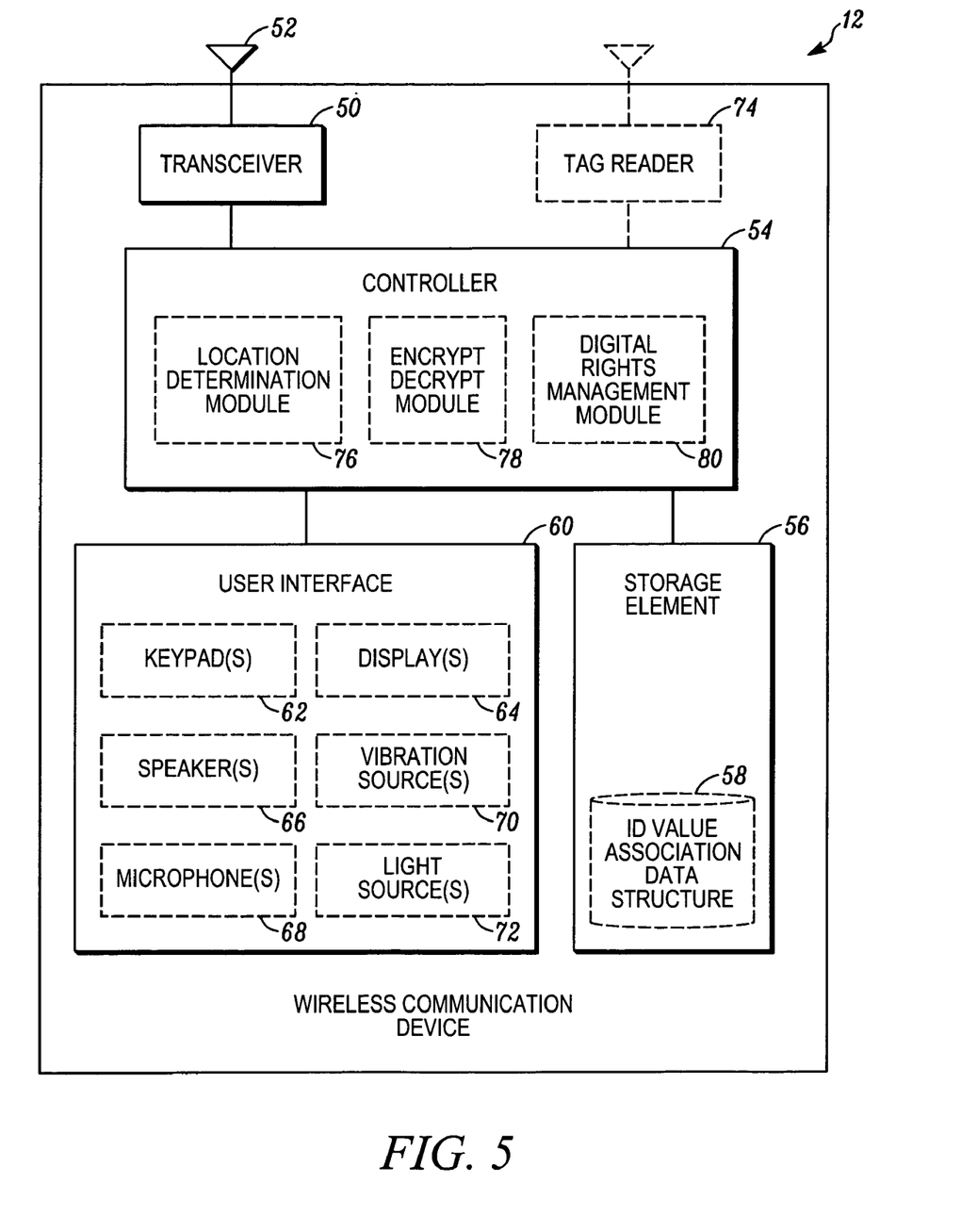
FIG. 5 is a block diagram of an exemplary wireless communication device for use with one or more tags, in accordance with at least one embodiment of the present invention.

FIG. 5 illustrates an exemplary wireless communication device 12, such as a radio frequency telephone or cellular telephone, for use in accordance with at least one embodiment of the present invention. As exemplarily illustrated, the wireless communication device 12 includes a transceiver 50 coupled to an antenna 52, which facilitates communication within a wireless communication network 14. Communications via the transceiver 50 are largely managed by a controller 54, which appropriately configures the transceiver 50 for current communication conditions and processes and/or provides both the receive and send data streams. In many instances, the controller incorporates one or more microprocessors, which execute routines written in executable code, as well as other circuitry for managing the control of the operation of the wireless communication device 12.

Examples of various modules, which can incorporate routines written in executable code and/or other circuitry for managing the control of the operation of the wireless communication device 12, include modules for location determination 76, encryption and decryption 78, and digital rights management 80. These modules also represent functionality associated with a wireless communication device 12, which could be selectively invoked as part of the interaction of the wireless communication device 12 with the one or more tags 18. One skilled in the art will readily recognize that other functions could additionally or alternatively be performed by the wireless communication device 12 in connection with the operation of the controller 54, as well as the interaction with the one or more tags 18.

A storage element 56 is coupled to the controller, which in at least one embodiment is comprised of memory circuits, which can include both volatile and non-volatile memory elements. The storage element 56 can be used to store the routines and any corresponding executable code used to manage the operation of the wireless communication device 12, as well as other configuration data. In at least some embodiments, the storage element 56 can be used to store a copy of the full or abridged version of the ID value association data structure 58.

Additionally coupled to the controller 54 is a user interface 60, which includes the various user interface elements that may be employed in the wireless communication device 12. The user interface 60 can include various buttons and/or keypads 62, displays 64, speakers 66, microphones 68, vibration sources 70, light sources 72, as well as any other element that receives or produces an effect that can be produced or sensed by a user 40 of the device 12. In some instances a single element can produce multiple effects, such as a multifunction transducer, which can sometimes be used to produce both audible and vibratory effects.

The wireless communication device 12 can additionally include a tag reader 74, which can take various different forms depending on the nature of the technology employed in the tags 18, and/or hub 20. The tag reader 74 could be used to communicate with the one or more tags 18, either directly or indirectly, via a hub 20. In some instances, different tags may employ different technologies, which may result in the wireless communication device incorporating multiple types of tag reader technology. A hub may additionally or alternatively incorporate the multiple different types of tag reader technology. In some instances, the transceiver 50 may be used to interface with one or more of the tags 18 and/or the hub 20. In these instances, a tag reader 74 separate from the transceiver 50 may not be used. In at least some embodiments, the wireless communication device 12 can incorporate RFID tag reader technology. In other embodiments, communication with the one or more tags 18 can be facilitated through an already existing transceiver, such as a bluetooth transceiver, which may or may not be the same as the wireless communication network transceiver 50.

Figure 6:
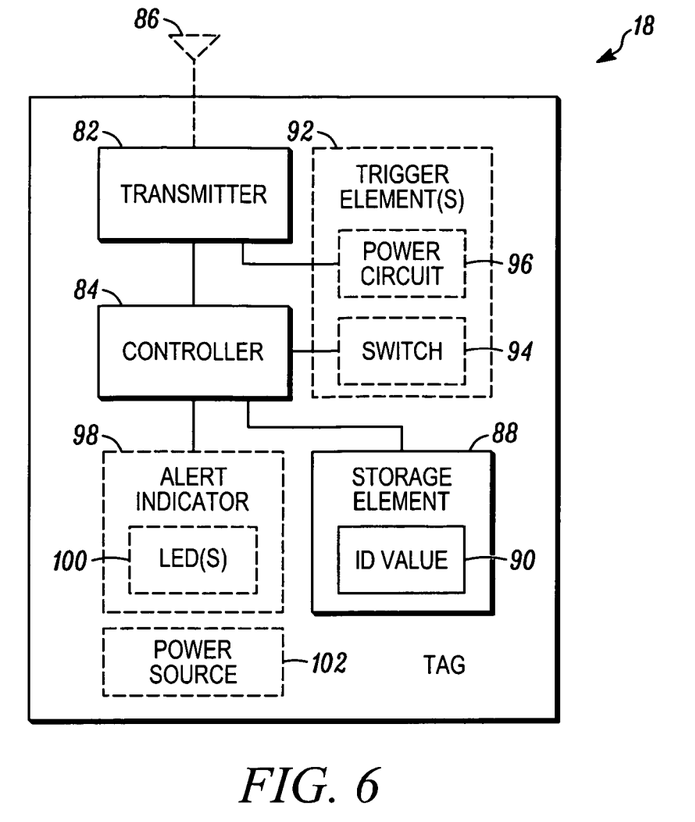
FIG. 6 is a block diagram of an exemplary tag in accordance with at least one embodiment of the present invention, which can be used with the wireless communication device illustrated in FIG. 5.

FIG. 6 illustrates a block diagram of an exemplary tag 18 in accordance with at least one embodiment of the present invention, which can be used in connection with the wireless communication device illustrated in FIG. 5. The tag 18 includes a transmitter 82 coupled to a controller 84 for use in communicating with the wireless communication device 12, either directly or via an intermediary, like a hub 20. In at least some embodiments the transmitter 82 will communicate wirelessly, via an antenna 86. However, in other embodiments, as noted above, the transmitter 82 of the tag 18 will communicate over a physical connection, such as a wire.

Generally, the tag 18 will have at least transmit capabilities. However, in some embodiments, the transmitter 82 will be incorporated as part of a transceiver, which additionally provides signal receipt capabilities. The controller 84 of the tag 18 is additionally coupled to a storage element 88, which includes an ID value 90. The ID value 90 could be hard coded and/or stored in a memory circuit, wherein the memory circuit may incorporate volatile or non-volatile memory elements. In at least some embodiments, the ID value 90 will be fixed, where any modification of the associated actions to be initiated in a nearby wireless communication device 12 can occur as part of changes to the data stored in a record associated with the ID value 90 in a corresponding data structure, which as noted above can be stored on a server 30 or in the wireless communication device 12. In other embodiments, it may be possible to change the ID value 90.

In accordance with at least one aspect of the present invention, transmission of the ID value 90 by the tag 18, and receipt of the same by the wireless communication device 12 will facilitate the initiation of one or more actions to be executed by the wireless communication device. In at least some embodiments, the transmission of the ID value 90 will be prompted by the activation of one or more trigger elements 92. In at least some embodiments, the trigger element(s) 92 will include a user actuatable switch 94, which when actuated will contribute to the ID value 90 being transmitted. In at least some other embodiments, the trigger element(s) 92 will include a power circuit 96 which is adapted to derive power from a received signal for use by the rest of the tag's circuit elements, which similarly when activated will contribute to the ID value 90 being transmitted.

Relative to the switch 94, the switch can be used to decouple the antenna 86 from the transmitter 82 and/or selectively disable the antenna 86. Alternatively, the switch could produce an actuated state and an unactuated state, which is detectable by the controller 84, which in turn will control the transmission of the ID value 90 in response to the detected state. One skilled in the art will readily appreciate that other trigger elements could be used and/or the described trigger elements could be used in alternative ways to facilitate the transmission of the ID value 90.

The transmission of the ID value 90 in response to the activation of the respective trigger elements 92, and corresponding receipt of the ID value 90 by the wireless communication device 12 can result in the execution of one or more actions in the nearby wireless communication device 12. Examples of actions that can be initiated in the wireless communication device 12 through the receipt of a corresponding ID value can include the initiation of a telephone call to a predetermined telephone number. In the noted example the telephone number could be encoded in the ID value 90. Alternatively, the telephone number could be stored in connection with a corresponding record in a maintained data structure 28 or 32, such as a database.

Further examples of actions, in response to activation of the one or more trigger elements 92, include the initiation of a data connection to a predetermined network resource, like an internet address, associated with the ID value 90, which could include downloadable content. The downloadable content, in turn, could be presented to the user via the user interface of the wireless communication device 12. Examples of downloadable content include: a music file, a web page, and a picture. Furthermore, the data could be provided in encrypted form, which requires a decryption key associated with the ID value 90 to produce the unencrypted data. Still further, access to the downloadable content may require a digital rights management certificate or key, which similarly could be made available to the wireless communication device 12 through the received ID value 90.

Alternatively, the data connection might facilitate the upload of information to a connected network resource, i.e. a user initiated back-up. Still further examples of actions might include the ability to launch a prestored program or application on the wireless communication device 12, which performs a desired function, i.e. data synchronization with another device, or might trigger the update of the software stored on the wireless communication device 12 through a network connection. One skilled in the art will readily recognize that still further possible actions could be linked to a tag 18.

In at least some embodiments, the tag 18 can additionally include one or more alert indicators 98. The alert indicators can provide feedback to a user, where the feedback that is associated with a particular tag might have a predetermined meaning. At least one example of an alert indicator includes one or more light sources, such as a light emitting diode (LED) 100. Other examples of possible alert indicators 98 include sound emitting elements, elements to produce a tactile response, and elements to produce an olfactory response.

Where a tag is associated with a particular individual (or group), the alert indicator 98 might produce an alert when a call is received from the associated individual. Similarly, the alert indicator 98 might produce an alert when the particular individual is detected as being present online, or within the proximity of a predesignated location, such as a variable location, like the location of the tag, or a fixed location, like a particular meeting location (work, school, the mall). Other presence information could similarly be utilized. Correspondingly, one or more satisfying conditions could be put into place, to limit the presentation of an alert and/or to limit access to the corresponding presence information in certain circumstances, at least some of which could be in the control of the particular associated individual. In some instances, the presence information may be available through a corresponding server associated with the wireless communication network 14, which is received by the wireless communication device 12 and relayed to the tag 18, via the possible receiver (transceiver), which could be incorporated as part of the tag 18, as noted above.

The tag can additionally include a power source 102 in addition to or in place of the above noted power circuit 96. Such a power source may be particularly suitable in cases where an alert indicator 98 is provided, which requires more active functionality on the part of the tag 18 in addition to transmitting an ID value 90. Where the tag 18 is coupled to the hub 20 via a physical connection 26, power may also be supplied to the tag 18 from the hub 20 via the physical connection 26.

Figure 7:
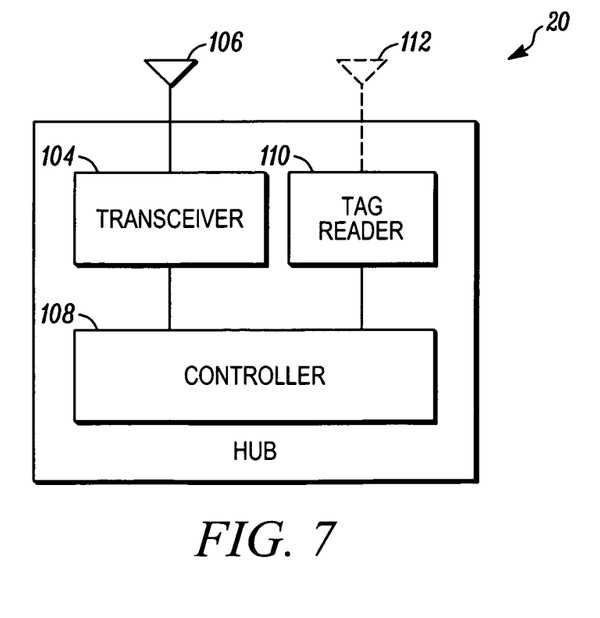
FIG. 7 is a block diagram of an exemplary hub in accordance with at least one embodiment of the present invention, which can be used with the exemplary wireless communication device illustrated in FIG. 5 and the exemplary tag illustrated in FIG. 6.

FIG. 7 illustrates a block diagram of an exemplary hub 20 in accordance with at least one embodiment of the present invention, which can be used with the exemplary wireless communication device 12 illustrated in FIG. 5 and the exemplary tag 18 illustrated in FIG. 6. Generally, the hub 20 includes a transceiver 104 coupled to an antenna 106, which is adapted for communicating with at least the wireless communication device 12. The hub, additionally, generally includes a controller 108 coupled to the transceiver 104 and a tag reader 110 coupled to the controller 108.

As noted previously, the hub 20 could communicate with the one or more tags 18 through a direct physical connection 26, or wirelessly 24, in which case the tag reader would likely be coupled to a corresponding antenna 112. Generally, the controller 108 is adapted to process the transmission and reception of information transmitted between the wireless communication device 12 and the one or more tags 18, and facilitate any necessary protocol conversions. The hub 20 will generally additionally include some form of a power source, not shown, for supplying power to the associated circuitry, and, as noted above, in some embodiments for supplying power to an associated tag 18.

FIGS. 8-13 illustrate partial schematic diagrams of exemplary tags for use with a wireless communication device 12 and/or a hub 20, in accordance with one or more embodiments. The tags can sometimes be alternatively referred to as active or passive depending on the particular configuration. Passive tags often do not have a separate power source, largely relying upon the power derived from a signal received from a tag reader. Generally, the tag is inactive in the absence of receipt of a signal from the tag reader. Alternatively, active tags will often have a supplemental or alternative power source, which enables the tag to perform functions in addition to transmitting an ID value 90 even in the absence of a signal from the tag reader.

Figure 8:
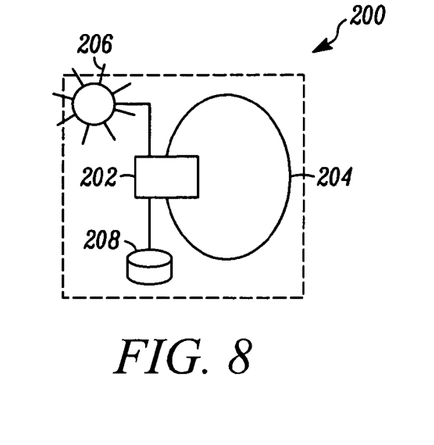
FIGS. 8-13 are partial schematic diagrams of multiple different embodiments of exemplary tags for use with a wireless communication device and/or a hub in accordance with one or more embodiments.

FIG. 8 illustrates an example of an active tag 200, which in addition to the corresponding circuitry 202, that can include the transmitter 82, controller 84 and storage element 88 illustrated in FIG. 6, and an associated antenna loop 204, includes an alert indicator (LED) 206 and a power source 208, such as a battery.

Figure 9:
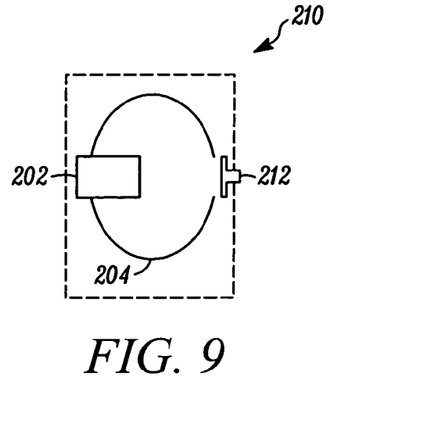

FIG. 9 illustrates an example of a passive tag 210, which in addition to the corresponding circuitry 202 and associated antenna loop 204, includes user actuatable switch 212. As noted previously the user actuatable switch can be used to decouple and/or disable the antenna 204, thereby precluding the tag 210 from receiving a signal from the tag reader and correspondingly responding to the received signal.

Figure 10:
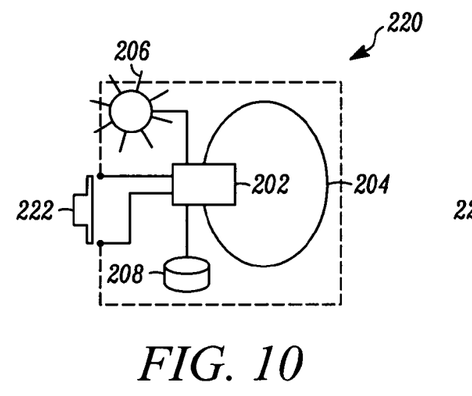

FIG. 10 illustrates a further example of a tag 220, which similarly includes corresponding circuitry 202 and an antenna loop 204. The tag 220 additionally includes an alert indicator 206, a power source 208, and a user actuatable switch 222. In this particular embodiment, the state of the switch 222 is detected by the corresponding circuitry 202.

Figure 11:
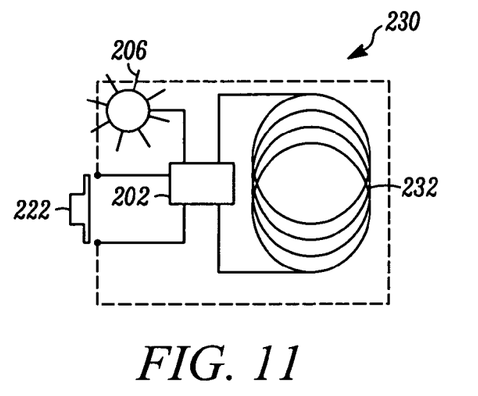

FIG. 11 illustrates a still further example of a tag 230. In this particular embodiment, the tag 230 includes corresponding circuitry 202, an alert indicator 206 and a user actuatable switch 222. Instead of an antenna loop 204, tag 230 incorporates an inductive coil 232, which is adapted for interacting with a proximate corresponding inductive coil in either a wireless communication device 12 or a hub 20. In the illustrated embodiment, the tag is adapted to receive power in addition to a communicative signal through the inductive coil 232. Use of an inductive coil may be particularly suitable for use in tags having an adhesive backing in the form of a sticker that might be attached to the wireless communication device 12.

Figure 12:
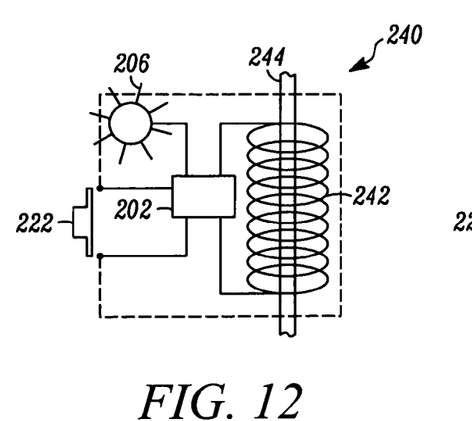

FIG. 12 illustrates a still further example of a tag 240, which is similar to the tag 230 illustrated in FIG. 11. However, an alternative inductive coil 242 is adapted for interacting with a conductive element, such as a wire 244, which extends through a passage that traverses the tag 240 through the center of the coil 242.

Figure 13:
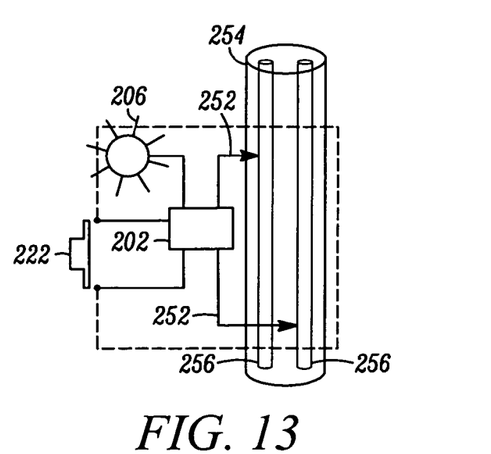

FIG. 13 illustrates yet a still further example of a tag 250, which is similar to the tags illustrated in FIGS. 11 and 12, with the exception that instead of communicating through an inductive coupling, the tag makes a physical connection to one or more conductive elements. In the illustrated embodiment, a pair of contacts 252 pierce an insulative outer sheathing 254, and makes a physical connection to a pair of conductive elements 256, respectively, which form part of a wire or strand, which can extend through or pass by proximate to the tag 250.

While the preferred and other embodiments of the invention have been illustrated and described, it will be clear that the invention is not so limited. For example, while several different tag embodiments have been illustrated and described, one skilled in the art will readily appreciate that still further tag embodiments are possible without departing from the teachings of the present invention. Numerous modifications, changes, variations, substitutions, and equivalents will occur to those of ordinary skill in the art without departing from the spirit and scope of the present invention as defined by the following claims.

What is claimed is:

1. A tag associated with one or more individuals other than the user of the tag and a radio telephone for facilitating interaction with the radio telephone relative to the one or more individuals, said tag comprising:
   a transmitter;
   a storage element including an ID value, associated with the one or more individuals;
   a receiver adapted for detecting transmissions from the radio telephone corresponding to the associated one or more individuals; and
   an alert indicator;
   wherein when the tag interacts with the radio telephone, the activities initiated through the resulting interactions with the radio telephone are affiliated with the associated one or more individuals; and
   wherein when a transmission corresponding to the associated one or more individuals is received, which matches a predefined condition, the alert indicator is actuated.

2. A tag in accordance with claim 1 for use in a system including a data structure, which associates at least a portion of the ID value with the one or more individuals.

3. A tag in accordance with claim 2, wherein the data structure is comprised as part of the radio telephone.

4. A tag in accordance with claim 2, further comprising a server communicatively coupled to the radio telephone, where the data structure is comprised as part of the server.

5. A tag in accordance with claim 1 further comprising one or more trigger elements.

6. A tag in accordance with claim 5 wherein said one or more trigger elements includes a user actuatable switch.

7. A tag in accordance with claim 6 wherein the tag additionally includes an antenna and a wireless transmitter, and wherein the user actuatable switch selectively couples the antenna to the wireless transmitter.

8. A tag in accordance with claim 6 wherein the tag additionally includes a transmitter and a power source, and wherein the user actuatable switch selectively couples the power source to the transmitter.

9. A tag in accordance with claim 5 wherein said one or more trigger elements includes a power circuit adapted for deriving power from received electromagnetic waves.

10. A tag in accordance with claim 1 further comprising a hub, which is worn by the user of the radio telephone, wherein the one or more tags communicate with the radio telephone via the hub.

11. A tag in accordance with claim 10 wherein the tag is communicatively coupled to the hub via a wired connection.

12. A tag in accordance with claim 10 wherein the tag is communicatively coupled to the hub via a wireless connection.

13. A tag in accordance with claim 10 wherein the tag is inductively coupled to the hub.

14. A tag in accordance with claim 1 wherein the ID value is stored in a storage element associated with the tag, which can be reprogrammed with an updated ID value.

15. A tag in accordance with claim 1 wherein the alert indicator includes a light emitting element.

16. A tag in accordance with claim 1 wherein the alert indicator includes a sound emitting element.

17. A tag in accordance with claim 1 wherein the alert indicator is adapted for producing a tactile response.

18. A tag in accordance with claim 1 wherein the transmission corresponding to the associated one or more individuals includes presence information.

19. A tag in accordance with claim 1 wherein the transmission corresponding to the associated one or more individuals includes proximity information.

20. A tag in accordance with claim 1 wherein the transmission corresponding to the associated one or more individuals includes identity information relative to a call received by the wireless communication device.

21. A tag in accordance with claim 5 wherein the one or more trigger elements includes a user actuatable switch.

22. A tag in accordance with claim 21 wherein when the user actuatable switch is actuated the tag interacts with the wireless communication device to initiate communication with the associated one or more individuals via the wireless communication device.

23. A tag in accordance with claim 1 wherein the tag includes an adhesive backing along at least one of the tag surfaces for affixing the tag to another surface.

24. A tag in accordance with claim 1 wherein at least one of the tag surfaces is adapted to mate with a corresponding structure on another surface.

25. A tag in accordance with claim 1 further comprising a passage which extend through the tag.

26. A tag in accordance with claim 1 wherein the tag has a visually distinct appearance relative to other tags.

27. A tag for initiating the execution of an action in a nearby radio telephone, said tag comprising:
a transmitter;
one or more trigger elements; and
a storage element including an ID value, associated with the action to be executed;
wherein when said radio telephone is located within a predetermined proximity of the tag and the associated one or more trigger elements are activated, the ID value, which is associated with an activity to be performed by the radio telephone, is adapted to be conveyed to the radio telephone via the transmitter;
wherein the action to be executed includes an initiation of a data connection to a predetermined network resource, which is associated with the ID value; and
wherein the data connection includes downloadable content.

28. A tag in accordance with claim 27 wherein the action to be executed includes a check of one or more qualifying conditions.

29. A tag in accordance with claim 27 wherein the action to be executed includes an initiation of a telephone call connection using a predefined telephone number, which is associated with the ID value.

30. A tag in accordance with claim 27 wherein the downloadable content is presented to the user via the nearby radio telephone.

31. A tag in accordance with claim 27 wherein the downloadable content is encrypted and wherein the key for decryption is associated with ID value stored in the tag.

32. A tag in accordance with claim 27 wherein access to the downloadable content is managed by a rights manager and wherein the key for access is associated with the ID value stored in the tag.

33. A tag in accordance with claim 27 wherein the data connection includes uploadable content.

34. A method for interacting with a radio telephone relative to one or more individuals, comprising:
associating an ID value with a tag, such that the tag has the ID value;
linking the ID value of the tag with one or more individuals other than a user of the tag and the radio telephone, wherein at least some of the interaction with the radio telephone relative to the linked one or more individuals is facilitated through interaction with the tag.

35. A method in accordance with claim 34, wherein the ID value associated with the tag is a tag identification value.

36. A method in accordance with claim 35, wherein the tag identification value is exclusively associated with the one or more individuals other than the user of the tag and the radio telephone.

* * * * *